United States Patent
Michael (10) Patent No.: US 7,263,592 B2
(45) Date of Patent: Aug. 28, 2007

(54) METHOD FOR COMPLETELY LOCK-FREE USER-LEVEL DYNAMIC MEMORY ALLOCATION

(75) Inventor: Maged M. Michael, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 10/811,634

(22) Filed: Mar. 29, 2004

(65) Prior Publication Data

US 2005/0216691 A1    Sep. 29, 2005

(51) Int. Cl.
*G06F 12/00* (2006.01)
(52) U.S. Cl. .................... 711/170; 711/147
(58) Field of Classification Search .............. None
See application file for complete search history.

(56) References Cited

U.S. PATENT DOCUMENTS

| | | | | |
|---|---|---|---|---|
| 6,539,464 B1 * | 3/2003 | Getov | ................ | 711/170 |
| 6,862,635 B1 * | 3/2005 | Alverson et al. | ............. | 710/52 |
| 7,047,297 B2 * | 5/2006 | Huntington et al. | ........ | 709/224 |
| 7,093,262 B2 * | 8/2006 | Ma et al. | ................ | 719/310 |
| 7,124,152 B2 * | 10/2006 | Fish | ................ | 707/204 |
| 7,149,189 B2 * | 12/2006 | Huntington et al. | ........ | 370/235 |
| 2003/0131098 A1 * | 7/2003 | Huntington et al. | ........ | 709/224 |
| 2003/0135525 A1 * | 7/2003 | Huntington et al. | ..... | 707/501.1 |
| 2003/0135612 A1 * | 7/2003 | Huntington et al. | ........ | 709/224 |
| 2004/0025164 A1 * | 2/2004 | Ma et al. | ................ | 718/107 |
| 2005/0154851 A1 * | 7/2005 | Charles | ................ | 711/170 |

* cited by examiner

*Primary Examiner*—Kevin Verbrugge
(74) *Attorney, Agent, or Firm*—Scully, Scott, Murphy & Presser, P.C; Derek S. Jennings (57) ABSTRACT

The present invention relates to a method, computer program product and system for a general purpose dynamic memory allocator that is completely lock-free, and immune to deadlock, even when presented with the possibility of arbitrary thread failures and regardless of thread scheduling. Further the invention does not require special hardware or scheduler support and does not require the initialization of substantial portions of the address space.

50 Claims, 8 Drawing Sheets

METHOD FOR COMPLETELY LOCK-FREE USER-LEVEL DYNAMIC MEMORY ALLOCATION

FIELD OF THE INVENTION

The present invention relates to user-level dynamic memory allocation in multithreaded programs, and more particularly, to general-purpose user-level dynamic memory allocation that is completely lock-free and immune to deadlock even in the event of thread crashes and strict priority-based thread scheduling.

BACKGROUND OF THE INVENTION

Currently, most computer programs use memory management mechanisms for dynamically allocating and deallocating memory blocks from their address spaces. When a program needs to allocate a memory block of a certain size, a dynamic memory allocation mechanism searches the available regions of the address space for a contiguous region that is large enough to accommodate the desired memory block size, and further, updates its book keeping data to indicate that the allocated region is no longer available. When the program no longer needs a memory block that it has previously allocated, the dynamic memory allocation mechanism updates its book keeping data to indicate that the memory block is available for future allocation.

In multi-threaded programs, multiple threads can concurrently use the dynamic memory allocation mechanism. In order to maintain correct program operation, the proper synchronization between threads is required when concurrently using the dynamic memory allocation mechanism. Without proper synchronization between threads many serious problems may arise, such as the allocation of the same memory block more than once or at the same time, or losing the ability to reallocate a deallocated memory block. These problems may lead the program to crash or to produce incorrect results.

The conventional approach for synchronization of access to data shared among multiple threads is the use of mutual exclusion locking mechanisms. A mutual exclusion lock protecting one or more shared data items guarantees that, at any time, no more than one thread can access the protected data. Before a thread can access the protected data, it has to acquire a lock. When the thread is done with the data, it can release the lock. Further, at any time no more than one thread can hold the same mutual exclusion lock on a data item. If a primary thread holds a lock and other secondary threads need to acquire the same lock in order to access the data protected by the lock, then these secondary threads will have to wait until the primary thread releases the lock in order to acquire the lock to access the desired data.

A straightforward approach to synchronizing access to the dynamic memory allocation mechanism among multiple threads is to use a single lock. The use of a single lock ensures that whenever a thread needs to allocate or deallocate dynamic memory blocks it has to acquire that lock, perform its desired memory management operation and release the lock. For the sake of better throughput on multiprocessor systems, more sophisticated implementations of dynamic memory allocation use multiple locks in order to allow some concurrency of execution between threads running on different processors whenever these threads need to perform dynamic memory management.

A common problem of all the above mentioned implementations that use locking is that the delay or crashing of even one thread can cause the dynamic memory allocator to be deadlocked, which in turn may cause the program to be deadlocked or unable to allocate dynamic memory. For example, if a thread crashes while holding a lock, without special help from the operating system it will remain unavailable indefinitely to other threads that may seek to acquire it.

Even if no threads crash, it is possible that a thread can be interrupted while holding a lock. If the interrupt signal handler needs to acquire the same lock and the thread will not be scheduled until the signal handler completes, then this situation can lead to deadlock. The signal handler is waiting for a lock that will not be released while the thread holding the lock will not be scheduled to run until the signal handler completes. For this reason, most systems prohibit the use of dynamic memory allocation functions in signal handlers.

An unconventional alternative concept to using locks is lock-free synchronization. Lock-free synchronization dates back to the IBM System 370, in which all threads have unrestricted opportunity to operate on shared data object. If an object is lock-free then it is guaranteed that whenever a thread performs some finite number of step towards an operation on the object, some thread, possibly a different one, must have made progress towards completing an operation on the object, regardless of the delay or crash failure of any number of other threads that may be also operating on the object. Therefore, if the dynamic memory allocation mechanism is implemented in a lock-free manner, then it will be immune to deadlock even if threads may crash or get delayed arbitrarily, and irrespective of thread scheduling decisions made by the programming environment scheduler.

Dynamic memory allocators known in the art are not lock-free, require special support from the programming environment and are not generally applicable or make trivializing assumptions. For example, it is trivial to design a lock-free memory allocator where each thread owns a separate region of the address space and can only allocate blocks from that region, and when a thread deallocates a block it just adds it to its own available blocks. However, such design can lead to unacceptable cases where one thread ends up with all available memory, while other threads are unable to allocate new blocks.

What is needed is a dynamic memory allocator that is: completely lock-free, independent of special support from the programming environment, that uses only widely-supported hardware instructions, is general-purpose, is immune to deadlock even with the possibility of crash failures, is immune to deadlock regardless of the thread scheduling decisions of the programming environment, can support an arbitrary dynamic number of threads, is not restricted to supporting a limited size of dynamic memory and does not need to initialize the contents of significant parts of the address space.

SUMMARY OF THE INVENTION

The present invention relates to a method, computer program product and system for a general purpose dynamic memory allocator that is completely lock-free, and immune to deadlock, even when presented with the possibility of arbitrary thread failures and regardless of thread scheduling. Further the invention does not require special hardware or scheduler support and does not require the initialization of substantial portions of the address space.

An embodiment of the present invention comprises a method for allocating a memory block, wherein the method comprises the step of determining the size of a requested memory block, wherein the method allocates a memory block directly from an operating system if it is determined that the memory block is a predetermined large size or allocates a memory block from an active memory super-block if it is determined that the memory block is a predetermined regular size. Further, the method comprises the steps of allocating a memory block from a partial super-block if the step of allocating a memory block directly from the active memory block fails and allocating a memory block from a new super-block if the step of allocating a memory block from the partial super block fails. Lastly, the method returns the memory block in response to the request.

Another embodiment of the present invention comprises a method for deallocating a previously allocated memory block, comprising the step of determining the size of a memory block, wherein the memory block is returned to the operating system if it is determined that the block is a large block. Further, the method comprises the steps of reading an anchor field descriptor of an associated memory super-block in order to acquire an availability descriptor, count descriptor and state descriptor value of the memory super-block and determining if the memory super-block is full or not full. Finally, the method comprises the step of atomically updating the anchor field descriptor of the associated memory super-block.

A further embodiment of the present invention comprises a computer program product that includes a computer readable medium useable by a processor, the medium having stored thereon a sequence of instructions which, when executed by the processor, causes the processor to allocate a memory block, wherein the computer program product executes the step of determining the size of a requested memory block, wherein the method allocates a memory block directly from an operating system if it is determined that the memory block is a predetermined large size or allocates a memory block from an active memory super-block if it is determined that the memory block is a predetermined regular size. Further, the method comprises the steps of allocating a memory block from a partial super-block if the step of allocating a memory block directly from the active memory block fails and allocating a memory block from a new super-block if the step of allocating a memory block from the partial super block fails. Lastly, the method returns the memory block in response to the request.

A yet further embodiment of the present invention comprises a computer program product that includes a computer readable medium useable by a processor, the medium having stored thereon a sequence of instructions which, when executed by the processor, causes the processor to deallocate a memory block, wherein the computer program product executes the steps of determining the size of a memory block, wherein the memory block is returned to the operating system if it is determined that the block is a large block. Further, the method comprises the steps reading an anchor field descriptor of an associated memory super-block in order to acquire an availability descriptor, count descriptor and state descriptor value of the memory super-block and determining if the memory super-block is full or not full. Finally, the method comprises the step of atomically updating the anchor field descriptor of the associated memory super-block.

An additional embodiment of the present invention comprises a computer system for allocating a memory block. The system comprises a memory block size determining means for determining the size of a requested memory block and a memory block allocating means for allocating a memory block directly from an operating system if it is determined that the memory block is a predetermined large size and for allocating a memory block from an active memory super-block if it is determined that the memory block is a predetermined regular size. Further, the memory block allocation means allocates a memory block from a partial super-block in the instance that the step of allocating a memory block directly from the active memory block fails, and allocates a memory block from a new super-block if the step of allocating a memory block from the partial super block fails.

A yet additional embodiment of the present invention relates to a computer system for deallocating a previously allocated memory block. The system comprises a memory block size determination means for determining the size of a memory block, wherein the memory block is returned to the operating system if it is determined that the memory block is a large block and a means to read the anchor field descriptor of an associated memory super-block in order to acquire an availability descriptor, count descriptor and state descriptor value of the memory super-block. Further, the system comprises a means to determine if a memory super-block is full or not full and a means to atomically update the anchor field descriptor of the associated memory super-block.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Embodiments of the present invention are described below in detail. The disclosed embodiments are intended to be illustrative only, since numerous modifications and variations therein will be apparent to those of ordinary skill in the art. In reference to the drawings, like numbers will indicate like parts continuously throughout the views.

The present invention uses several primary structures that are utilized frequently: heap headers, super-blocks, and super-block descriptors. Secondary structures that are utilized less frequently include: lists of partially full super-blocks, and lists of available super-block descriptors.

A heap header is associated with a size class, i.e. a range of memory block sizes. A heap header contains at least a pointer field and optionally a credits field. The pointer field either holds a null value or points to a super-block descriptor. When not holding a null value the credits fields indicates a lower bound on the number of memory blocks guaranteed to be available in the super-block associated with the super-block descriptor pointed to by the pointer field. In combination, the pointer field and the credits field form an active field that can be updated atomically.

A super-block is composed of a number of memory blocks of a certain size. The descriptor of a super-block keeps track of which memory blocks comprised within the super-block are available and which memory blocks are already allocated. The descriptor also may keep track of the number of available memory blocks in the super-block. A descriptor may contain at least a pointer field to a super-block, an available field that holds the index of the first available memory block in that super-block, a count field that holds the number of available blocks in that super-block (other than those already indicated by the credits field of a heap header that may point to this particular descriptor) and a state field that indicates whether the associated super-block is active, full, partially full, or empty. The fields active, count, and state form a field anchor that can be updated atomically.

By manipulating the active fields of heap headers and the anchor fields of super-block descriptors using instructions such as Compare-and-Swap, which are widely available either directly in hardware or easy to implement in a lock-free using other instructions, threads can maintain the consistency of the data of the dynamic memory allocator without using any locking or requiring special support from the thread scheduler.

Figure 1:
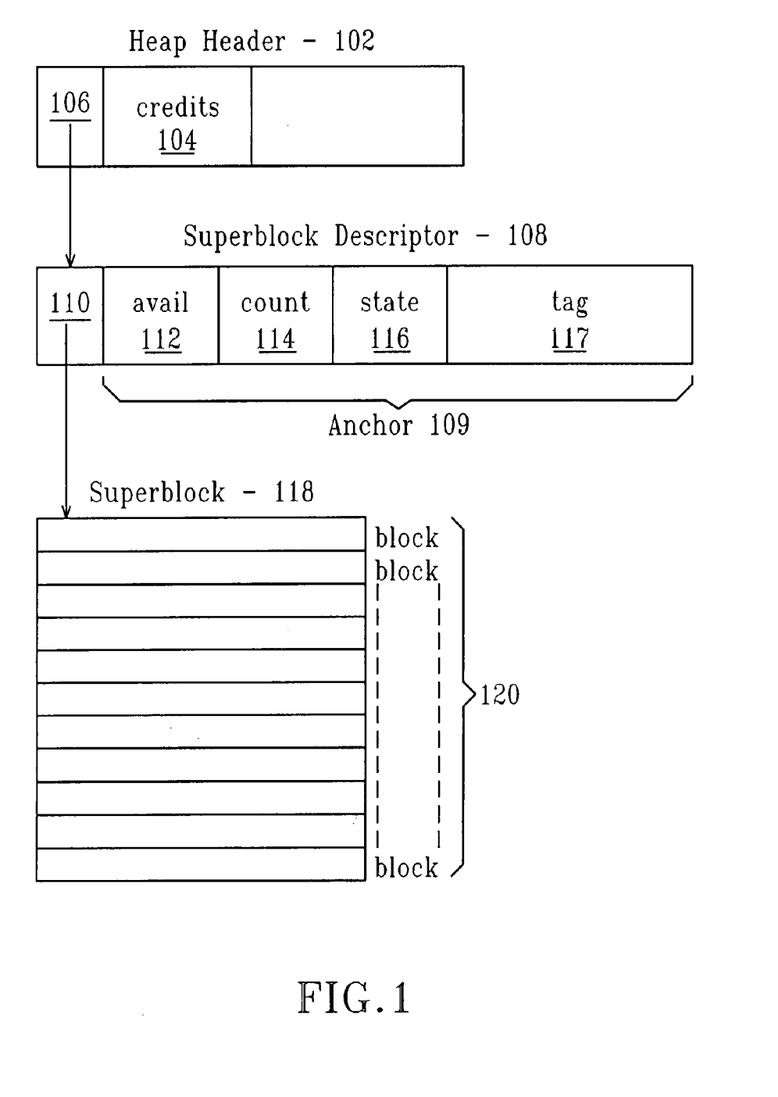
FIG. 1 is a diagram that depicts memory block structures used in embodiments of the present invention.

As illustrated in FIG. 1, a heap header 102 contains at least one field, an active field 106 that holds a pointer to a super-block descriptor 108. As an optimization, if the method chooses to align the addresses of super-block descriptors 108 to a power of 2 (e.g., $64=2^6$) then a credits subfield 104 can be carved from the active field 106, thereby creating two fields, a pointer field and a credits field 104, that can be within the active field 106, wherein the fields can be updated atomically. The credits field 104 holds the number of memory blocks 120 that are in the associated super-block 118, if any, that are guaranteed to be available less one. That is, if the credits field 104 holds the value n, then it must be the case that the associated super-block 118 contains at least n+1 available memory blocks 120. Whenever a thread decrements the credits subfield 104 (or sets active to null if credits is equal to zero), it is said to reserve a memory block 120 in the associated super-block 118 and that it is guaranteed to find an available block in that super-block.

As further illustrated in FIG. 1, a super-block 118 contains a number of memory blocks 120 of a certain size. A memory block 120 is an allocatable unit that can be returned in response to an allocation request.

A super-block descriptor 108 contains at least a pointer to a super-block 118 and an anchor field 109. The anchor field 109 contains the subfields: availability 112, count 114, state 116 and optionally a tag 117. The anchor field 109 can be updated atomically.

The availability subfield 112 of the anchor field 109 holds the index of the first available memory block 120 in the associated super-block 118, if any. The count subfield 114 of the anchor field 109 holds the number of available memory blocks 120 in the associated super-block 118, less those that are already indicated by the credits subfield 104 of an associated heap header 102. The anchor field 109 of at most one heap header 102 can point to a super-block descriptor 108 at a time.

The state subfield 116 of the anchor field 109 holds the state of the associated super-block 118. The possible states are ACTIVE, PARTIAL, FULL, and optionally EMPTY. A super-block 118 is said to be ACTIVE if the active field 106 of a heap header 102 points to its descriptor 108. A super-block 118 is said to be FULL if it is not ACTIVE and does not contain any unreserved available memory blocks 120. A super-block 118 is said to PARTIAL if it is neither ACTIVE nor FULL, and at least one of its memory blocks 120 is allocated. A super-block 118 is said to be EMPTY if it is not ACTIVE and none of its memory blocks 120 is allocated. The following is code describing the primary structures described above:

```
// Superblock descriptor structure
typedef anchor : // fits in one atomic block
    unsigned avail:10,count:10,state:2,tag:42;
// state codes ACTIVE=0 FULL=1 PARTIAL=2 EMPTY=3
typedef descriptor :
    anchor Anchor;
    descriptor* Next; // used to link descriptor in lists
    void* sb; // pointer to superblock
    heapheader* heap; // pointer to owner heap
    unsigned sz; // block size
    unsigned maxcount; // superblock size/sz
// heap header structure\\
typedef active : unsigned ptr:58,credits:6;
typedef heapheader :
    active Active; // initially NULL
    unsigned sz; // block size
```

The method uses the atomic primitive Compare-and-Swap (CAS) that is widely supported on mainstream processor architectures either directly in hardware or indirectly employed in software by similar primitives. CAS takes three arguments: the address of a memory location, an expected value, and a new value. If the memory location is found to hold the expected value, then the new value is written to it, atomically. A Boolean (i.e., a binary) return value indicates whether the write occurred. If it returns true, it said to succeed. Otherwise, it is said to fail.

Figure 2:
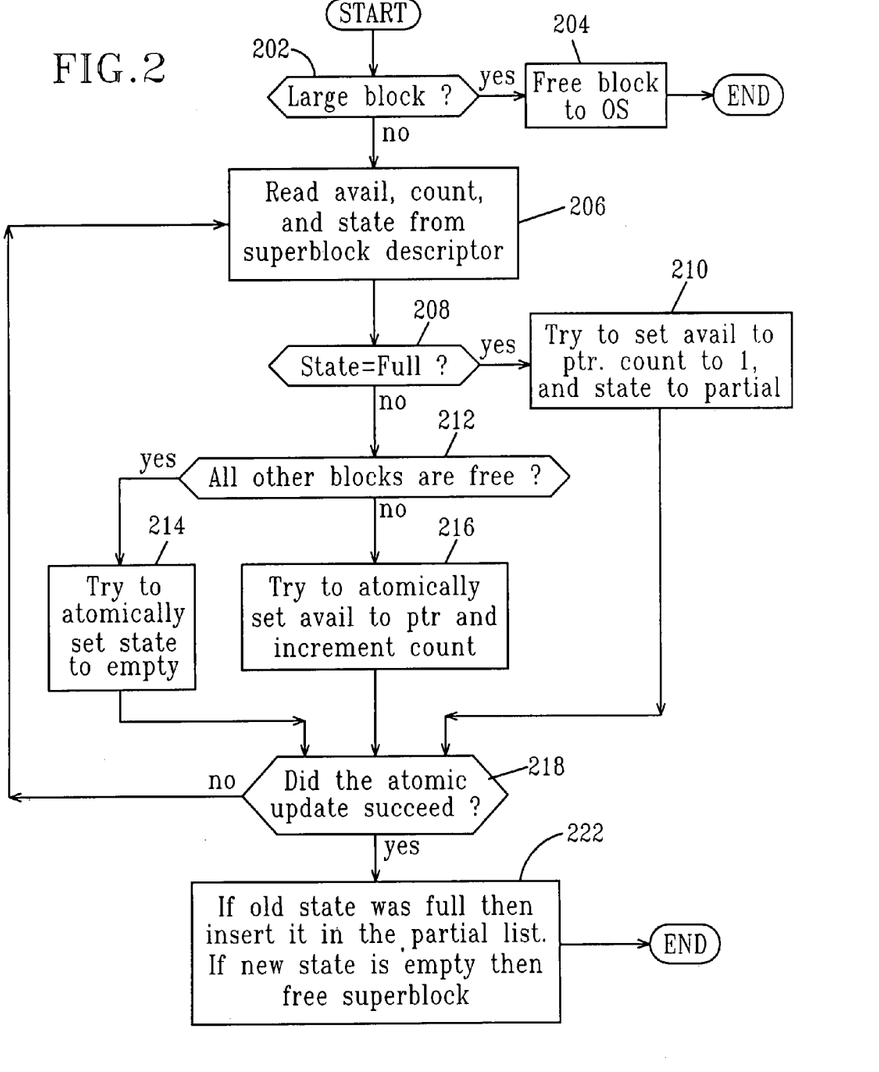
FIG. 2 is a flowchart depicting a method for deallocating a memory block that relates to embodiments of the present invention.

FIG. 2 illustrates a method for deallocating a previously allocated memory block 120 that relates to embodiments of the present invention. At step 202, the method determines whether the size of the memory block 120 is a regular or a large block. Large blocks are allocated and deallocated directly from the operating system. If it is determined that the memory block 120 is a large block, it is returned to the operating system at step 204. The size of the memory block 120 or a pointer to the descriptor 108 of its super-block 118 can be included with the memory block 120 at an agreed upon offset.

If it is determined that the deallocated memory block 120 is of regular size, at step 206 the thread reads the anchor field 109 of the associated super-block descriptor 108. Next, at step 208 it is determined if the state subfield 116 of the value read from the anchor field 109 indicates that the super-block 118 is a FULL super-block 118. If the super-block value is FULL, the thread at step 210 tries to update the anchor field 109 atomically using CAS as follows: set availability 112 to the index of the deallocated block 120, and set count value 114 to 1, and set the state value 116 to PARTIAL, all together atomically, only if the anchor field 109 is found to hold the same value as read earlier in step 206.

If the super-block value is found to be not FULL (i.e., It must be either ACTIVE or PARTIAL), then the thread checks at step 212 if all the other memory blocks 120 in the super-block 118 are available and that the super-block 118 is not ACTIVE. If so, the super-block 118 must be PARTIAL and the thread tries to update the anchor field 109 atomically at step 214 using CAS as follows: set state value 116 to EMPTY, only if the anchor field 109 is found to hold the same value as read earlier in step 206.

If the super-block 118 is found to be ACTIVE or to contain allocated memory blocks 120, then at step 216 the thread tries to update the anchor field 109 atomically using CAS as follows: set availability value 112 to the index of the deallocated block 120 and increment the count value 114, only if the anchor field 109 is found to hold the same value as read earlier in step 206.

The three paths described above provides a way to update the anchor field 109 atomically using CAS. At step 218, a determination is made as to whether the update should take place if and only if the anchor field 109 value is found to be the same as read earlier in step 206. If the update fails because the anchor field 109 value is found to be different, the thread goes back to step 206 and reads a fresh value from the anchor field 109 and proceeds as described above. The CAS fails only if another thread succeeded in updating the anchor field 109 and hence it must be making progress towards completing its operation (either allocation or deallocation).

If the CAS succeeds then the threads proceed as set forth in step 222: If the old value of the state subfield 116 of the anchor field 109 was FULL, then the thread must insert the super-block descriptor 108 in some list of partially full super-blocks 118 in the same size class. This may be done easily in a lock-free manner. If the new state of the super-block 118 is EMPTY, then the super-block 118 may be returned to the operating system or, if desired, can be kept in a list for empty super-blocks 118 for future allocations for any size class.

The following is representative code for the deallocation method, conventionally known as free:

```
   free(ptr) {
1  if (!ptr) return;
2  ((void**)ptr)--; // get block prefix
3  desc = *(descriptor**)ptr;
4  if (large_block(desc))
      //Large block
5     Return block to the operating system.
   //Regular block
6  do {
7     newanchor = oldanchor = desc->Anchor;
8     *(unsigned*)ptr = oldanchor.avail;
9     newanchor.avail = (ptr-desc->sb)/desc->sz;
10    if (oldanchor.state == FULL) {
         // FULL superblock
11       newanchor.count = 1;
12       newanchor.state = PARTIAL;
13    } else if (oldanchor.count+1==desc->maxcount) {
14       // not ACTIVE and other blocks are free.
         state must be PARTIAL\\
15       newanchor.count = 0;
16       newanchor.state = EMPTY;
17    } else // state is ACTIVE or PARTIAL
18       newanchor.count++;
19    fence. // make sure that the write in line 8 already complete
20 } until CAS(&desc->Anchor,oldanchor,newanchor);
   // the CAS succeeded
```

```
21    if (oldanchor.state == FULL)
22       PartialPush(desc);
23    else if (newanchor.state == EMPTY) {
24       Return desc->sb to the operating system.
25       Remove desc and retire it for future reuse.
   }
```

Figure 3:
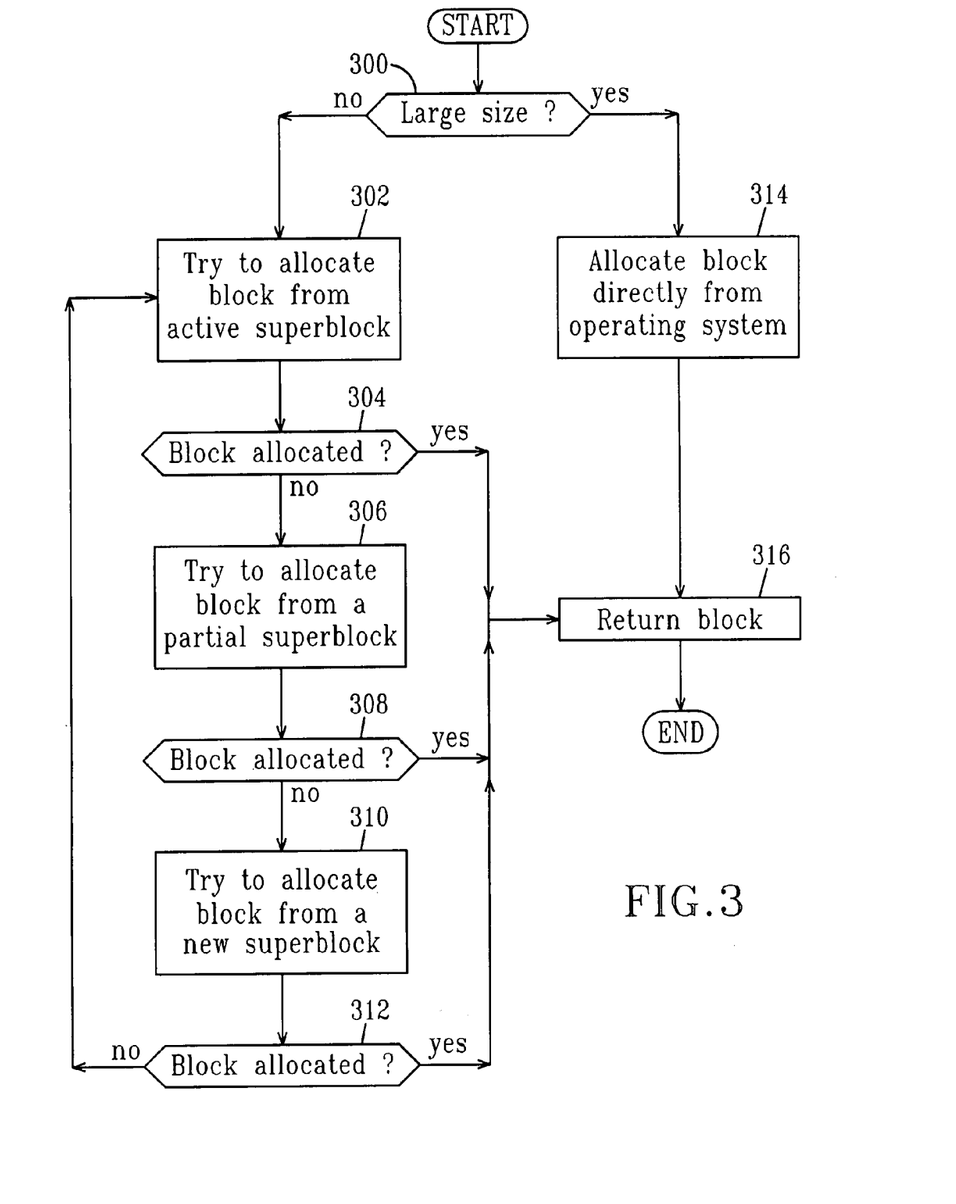
FIG. 3 is a flowchart depicting a method for allocating a memory block that relates to embodiments of the present invention.

A method for allocating a memory block 120 that relates to embodiment of the present invention is illustrated in FIG. 3. At step 300, it is determined if the requested size of a memory block 120 is regular or large. If the size of the requested memory block 120 is large, then at step 314, the thread allocates a memory block 120 directly from the operating system. If the requested memory block 120 size is not large, then at step 302, the thread first tries to allocate a memory block 120 from the active super-block 118, if any. If this action is determined to be not successful at step 304, then at step 306 the thread tries to allocate a memory block 120 from a partial super-block 118. If this action is determined to not be successful at step 308, then at step 310 the thread attempts to allocate a memory block 120 from a new super-block 118. If a memory block 120 is determined to not be allocated at step 312, then the thread goes back to step 302 and tries to allocate a block 120 from the active super-block 118. If it is determined that a memory block 120 was returned from any of the steps 304, 308 and 312, then at step 316 the memory block 120 is returned in response to the request.

Every time the thread goes through the loop and fails to allocate a memory block 120, it must be the case that some other thread has succeeded in allocating a memory block 120. The following is representative code for allocating a memory block 120, which is conventionally known as malloc:

```
   void* malloc(sz) {
   // Use sz and optionally the thread id to find the appropriate heap.
1  heap = find_heap(sz);
2  if (!heap) // Large block
3     Allocate block from the operating system and return its
      address.
   while(1) {
4     addr = MallocFromActive(heap);
5     if (addr) return addr;
6     addr = MallocFromPartial(heap);
7     if (addr) return addr;
8     addr = MallocFromNewSB(heap);
9     if (addr) return addr;
   }
}
```

Figure 4:
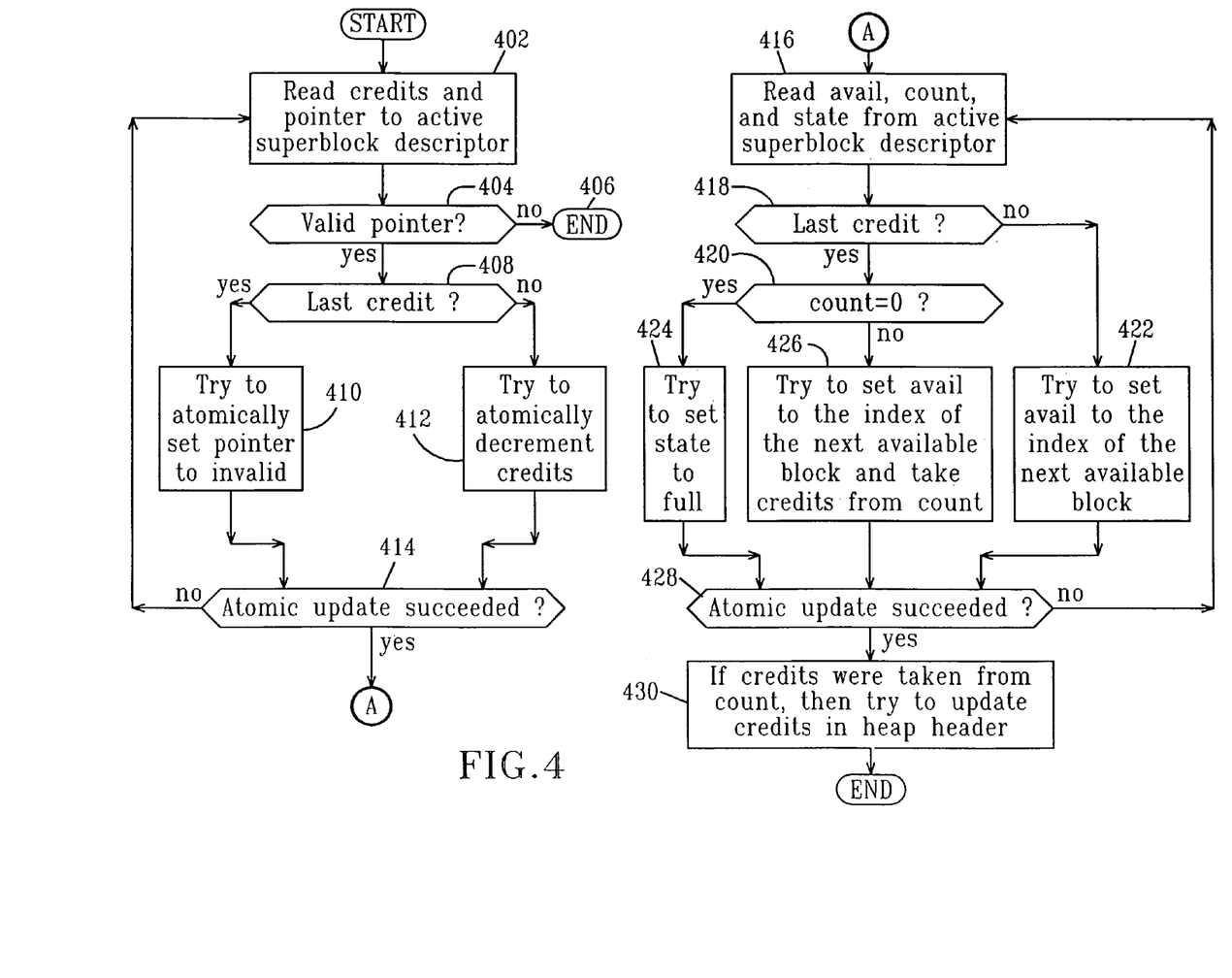
FIG. 4 is a flowchart depicting a method for allocating a block from an active super-block that relates to embodiments of the present invention.

FIG. 4 illustrates a method for trying to allocate a memory block 120 from an active super-block 118 that relates to embodiments of the present invention. At step 402, the thread starts by reading the active field 106 of a heap header 102. It is determined at step 404 whether the pointer is null (conventionally 0), i.e., there is no active super-block 118 associated with this heap. If the pointer is null then, at step 406 the attempt fails returns null to indicate its failure to allocate a memory block 120 so that the thread can proceed to attempt to allocate a memory block 120 from a partial super-block 118.

If it is determined at step 404 that the pointer value in the active field 106 is not null, then at step 408 the thread checks if the credit field 104 value is zero or more. If the value of credits is zero, then this indicates that there is only one memory block 120 that can be reserved in the associated super-block 118. In such a case, at step 410 the thread tries to update the active field 106 to the value null using CAS, only if the value of the active field 106 is found to be the same as read earlier in step 402, in order to indicate that the heap is no longer guaranteed to have memory blocks 120 available for reservation from the active super-block 118.

If the value of credits is one or more, then this indicates that even after the thread reserves a memory block 120 there will be more blocks 120 available for reservation. In such a case, at step 412, the thread tries to update the active field 106 atomically using CAS in order to decrement credits, only if the value of the active field 106 is found to be the same as read earlier in step 402. If the CAS fails, then the threads goes back to step 402 and reads a fresh value from the heap header 102. The CAS in step 412 fails only if some other thread was successful in reserving a memory block 120.

If it is determined at step 414 that the CAS succeeds, then the thread proceeds to step 416 and reads the anchor field 109 of the associated super-block descriptor 108, whose address it read earlier in step 402 from the pointer component of the active field 106 of the heap header 102. If it is determined at step 418, that the thread has not taken the last credit (i.e., credits was more than zero when last read in step 402), then at step 422 the thread updates the anchor field 109 atomically using CAS as follows: set availability field 112 value to the index of the next available memory block 120 (if none then set it to any arbitrary value), only if the anchor field 109 is found to hold the same value as read earlier in step 416.

If, at step 418, the thread has taken the last credit (i.e., the value of credits was zero when the active field 106 was last read in step 402), then at step 420 the thread checks if the count subfield 114 value as read from the anchor field 109 in step 416 is zero. If so, then the super-block 118 does not contain any more memory blocks 120 available for reservation, and so at step 424 the thread updates the anchor field 109 atomically using CAS by setting the state subfield 116 to FULL, only if the anchor field 109 value is found to be the same as read earlier in step 416.

If at step 418 the thread did not reserve the last credit and at step 420 the count subfield 114 of the anchor field 109 is more than zero, then at step 426 the thread attempts to take more credits with the goal of adding them to the heap header 102, by attempting to update the anchor field 109 atomically using CAS as follows: set the availability field 112 value to the index of the next available memory block 120 and take credits from the count 114 value, only if the anchor field 109 value is found to be the same as read earlier in step 416.

If it is determined at step 428 that the CAS fails, then the thread goes back to step 416 and reads a fresh value from the anchor field 109. CAS fails only if another thread has made progress towards an operation (allocate or deallocate) on the super-block 118.

If it is determined at step 428 that the CAS succeeded, the thread has succeeded in allocating a memory block 120 with index equal to the value of the availability subfield 112 of the anchor field 109 as last read in step 416. If the thread has taken credits from the count subfield 114 of the anchor field 109, then at step 430 it tries to update the credits subfield 104 of the active field 106 of the heap header 102 as described below.

The following is representative code for the method for allocating a memory block 120 from the active super-block 118:

```
   void* MallocFromActive(heap) {
     do { // First stage: reserve block
1        newactive = oldactive = heap->Active;\\
2        if (!oldactive) return NULL;
3        if (oldactive.credits == 0)
4              newactive = NULL;
         else
5              newactive.credits--;
6    } until CAS(&heap->Active,oldactive,newactive);
     // Second stage: pop block
7    desc = mask__credits(oldactive);
     do {
         // state may be ACTIVE, PARTIAL or FULL
8        newanchor = oldanchor = desc->Anchor;
9        addr = desc->sb+oldanchor.avail*desc->sz;
10       next = *(unsigned*)addr;
11       newanchor.avail = next;
12       newanchor.tag++;
13       if (oldactive.credits == 0) {
             // state must be ACTIVE
14           if (oldanchor.count == 0)
15                 newanchor.state = FULL;
             else {
16                 morecredits = min(oldanchor.count,
                                    MAXCREDITS);
17                 newanchor.count -= morecredits;
             }
         }
18   } until CAS(&desc->Anchor,oldanchor,newanchor);
19   if (oldactive.credits==0 && oldanchor.count>0)
20       UpdateActive(heap,desc,morecredits);
21   *addr = desc; return addr+EIGHTBYTES;
   }
```

Figure 5:
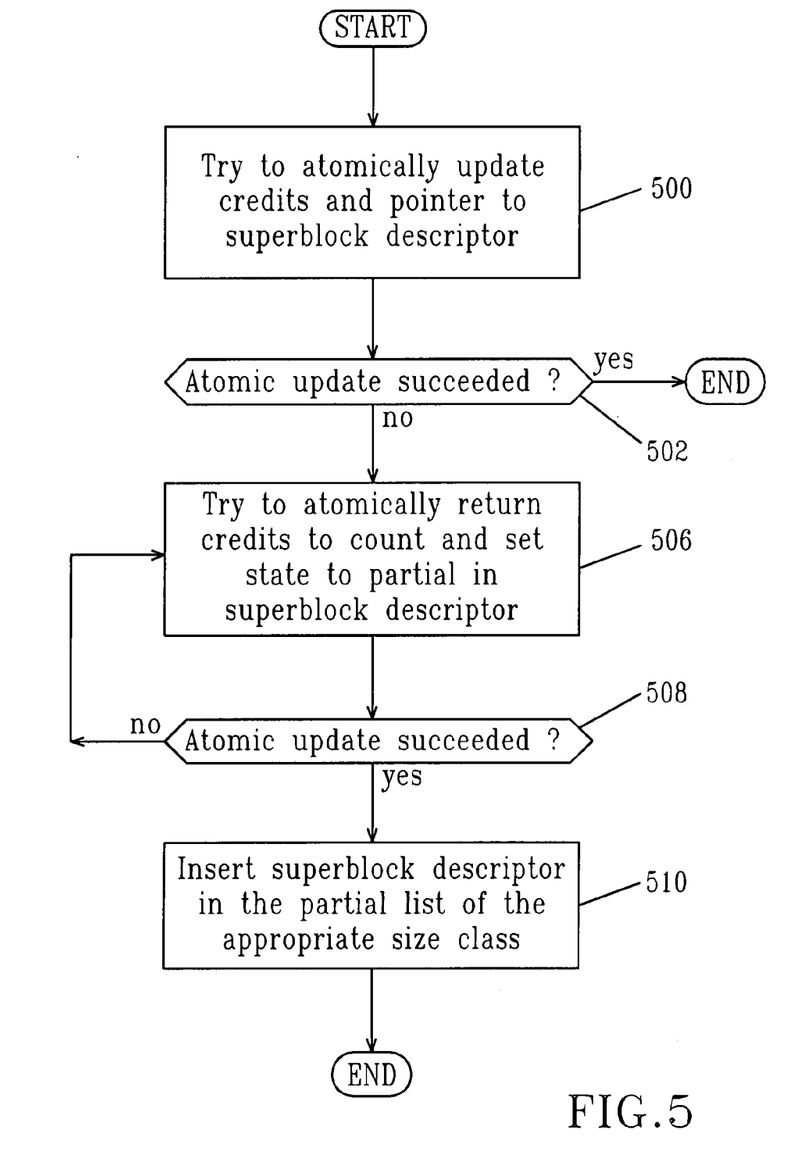
FIG. 5 is a flowchart depicting a method for updating heap header credits that relates to embodiments of the present invention.

FIG. 5 depicts a method for updating the credit field 104 values in a heap header 102 that relates to embodiments of the present invention. At step 500 a thread tries to update the active field 106 of the heap header 102 atomically using CAS by setting the pointer subfield to the address of the associated super-block descriptor 108 and setting the credits subfield 104 to one less than the credits taken earlier from the count subfield 114 of the anchor field 109 of the super-block descriptor 108, only if the active field 109 is found to hold the value null. If, at step 502, the CAS succeeds, then the credits have been transferred successfully to the heap header 102.

If, at step 502, the CAS fails, then some other thread must have updated the heap header 102 active field 106, and at step 506 an attempt is made to return the credits to the count subfield 114 of the anchor field 109 of the super-block descriptor 108. In such a case, the thread keeps attempting to update the anchor field 109 atomically using CAS as follows: add the credits to the count subfield 114, and set the state subfield 116 to PARTIAL. After it is determined at step 508 that the thread has succeeded, the thread proceeds at step 510 to insert the super-block 118 in a list of PARTIAL super-blocks 118 associated with an appropriate size class.

The following is representative code for the method for updating the credits in the heap header 102:

```
   UpdateActive(heap,desc,morecredits) {
1    newactive = desc;
2    newactive.credits = morecredits-1;
3    if CAS(&heap->Active,NULL,newactive) return;
     // Some other thread already installed another active superblock\\
     // Return credits to the superblock and make it partial
     do {
4        newanchor = oldanchor = desc->Anchor;
5        newanchor.count += morecredits;
```

-continued

```
6         newanchor.state = PARTIAL;
7     } until CAS(&desc->Anchor,oldanchor,newanchor);
8     PartialPush(desc);
}
```

Figure 6:
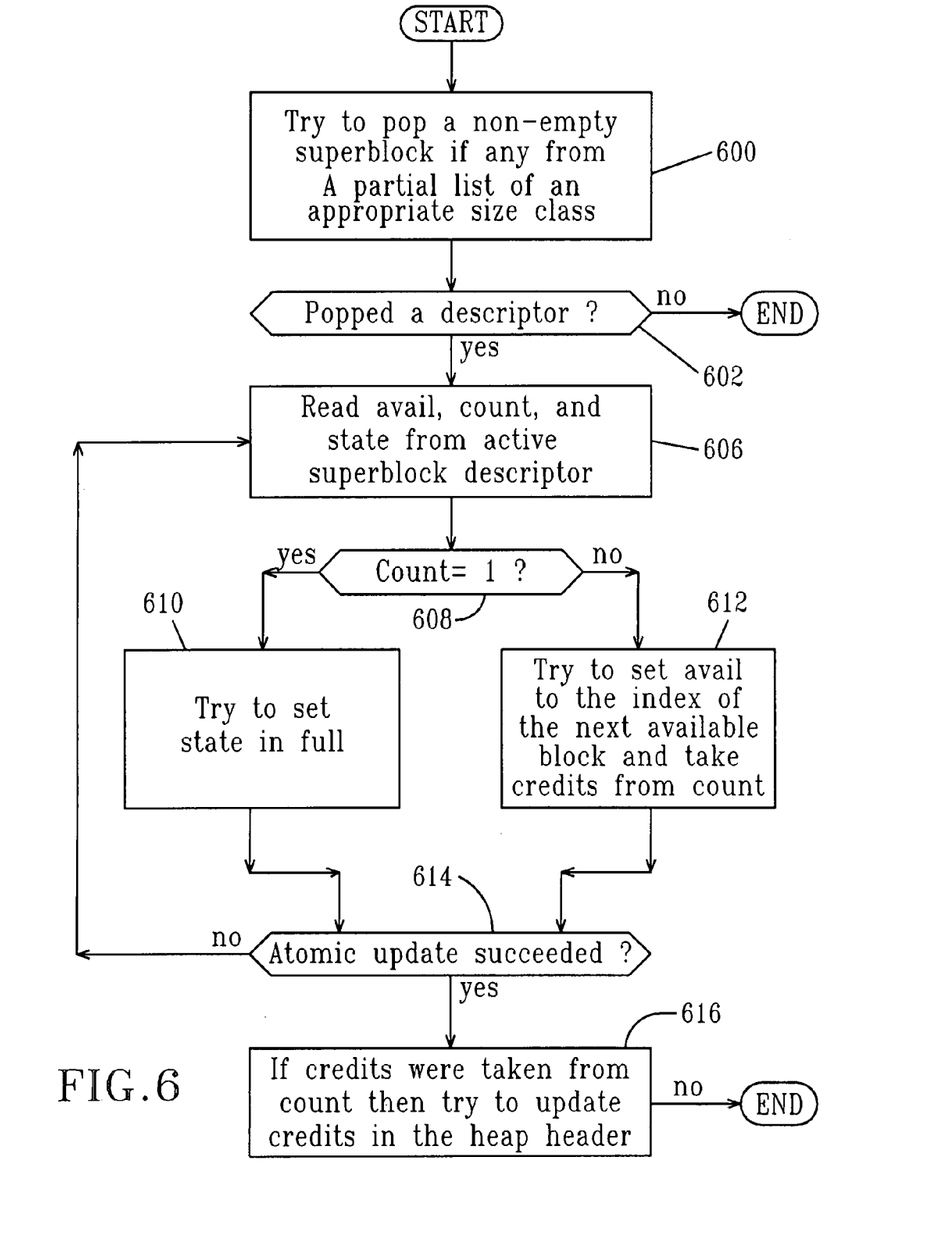
FIG. 6 is a flowchart depicting a method for allocating a block from a partial super-block that relates to embodiments of the present invention.

FIG. 6 depicts a method for allocating a memory block 120 from a partial super-block 118 that relates to embodiments of the present invention. At step 600, the thread attempts to pop a non-empty super-block 118 from a list of partial super-blocks 118 with an appropriate size class. If it is determined at step 602 that the thread has failed, the routine returns null to indicate that there are no partial super-blocks 118 available in the desired size class, so that the thread can proceed to try to allocate a memory block 120 from a new super-block 118.

If, at step 602, the thread the thread succeeds in popping a partial super-block 118, it proceeds at step 606 to read the anchor field 109 of the super-block's descriptor 108. If at step 608 the count subfield 114 is found to be equal to one, i.e., there is only one memory block 120 available, then at step 610 the thread updates the anchor field 109 atomically using CAS by setting the state subfield 116 to FULL, only if the anchor field 109 is found to hold the same value as read earlier in step 606.

If at step 608 it is determined that the count subfield 114 is found to be greater than one, then at step 612 the threads updates the anchor field 109 atomically using CAS as following: set the availability subfield 112 to the index of the next available memory block 120, and take credits from the count subfield 114, only if the anchor field 109 is found to hold the same value as read earlier in step 606.

If it is determined at step 614 that the CAS has failed, then the threads goes to step 606 and reads a fresh value from the anchor field 109. If it is determined at step 614 that the CAS has succeeded, then the thread has succeeded in allocating the memory block 120 with index equal to the value of the availability subfield 112 of the anchor field 109 as last read in step 606. If the thread has taken credits from the count subfield 114 of the anchor field 109, then at step 616 it tries to update the credits subfield 104 of the active field 106 of the heap header 102 as described above.

The following is representative code for the method for allocating a memory block 120 from a partial super-block 118:

```
        void* MallocFromPartial(heap) {
retry:
1       desc = PartialPop(heap);
2       if (!desc) return NULL;
3       desc->heap = heap;
        do {
4           newanchor = oldanchor = desc->Anchor;
5           if (oldanchor.state == EMPTY)
6               { DescRetire(desc); goto retry; }
            // state must be PARTIAL
7           addr = desc->sb+oldanchor.avail*desc->sz;
8           next = *(unsigned*)addr;
9           newanchor.avail = next;
10          newanchor.count--;
11          newanchor.tag++;
12          if (newanchor.count == 0)
13              newanchor.state = FULL;
            else {
14              morecredits = min(newanchor.count,
                    MAXCREDITS);
15              newanchor.count -= morecredits;
16              newanchor.state = ACTIVE;
17          }
18      } until CAS(&desc->Anchor,oldanchor,newanchor);
19      if (newanchor.state == ACTIVE)
20          UpdateActive(heap,desc,morecredits);
21      *addr = desc; return addr+EIGHTBYTES;
}
```

Figure 7:
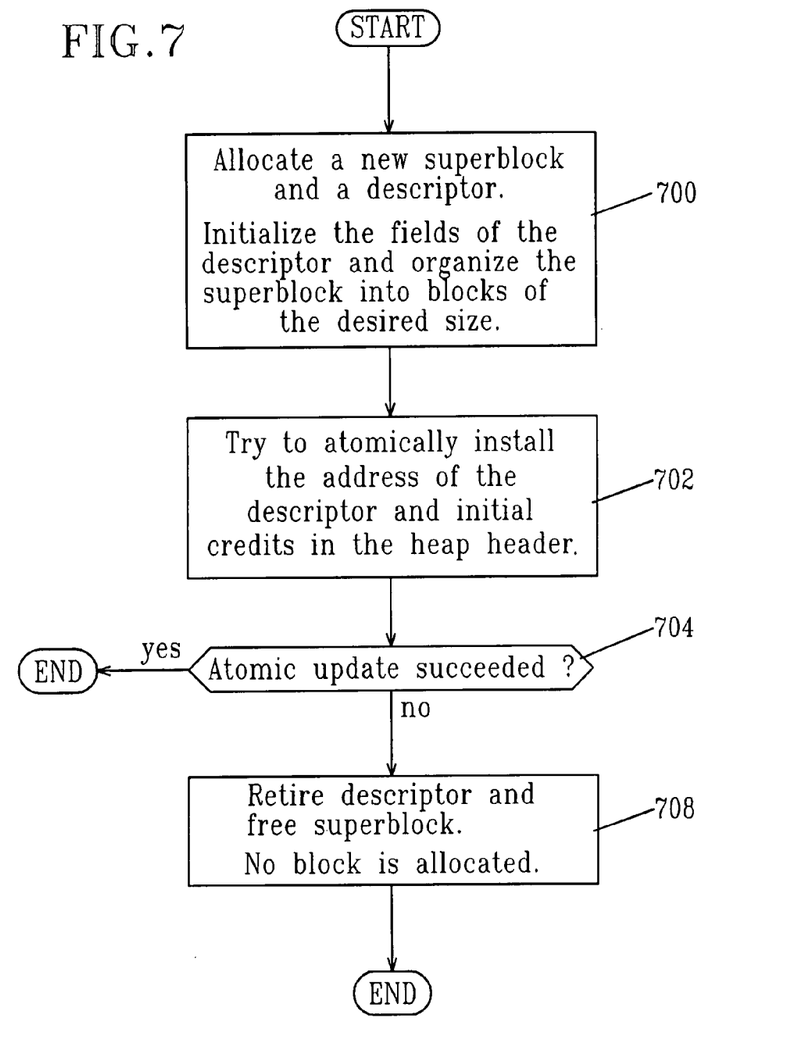
FIG. 7 is a flowchart depicting a method for allocating a block from a new super-block that relates to embodiments of the present invention.

FIG. 7 depicts a method for allocating a memory block 120 from a new super-block 118 that relates to embodiments of the present invention. At step 700 the thread starts by allocating a new super-block 118 from the operating system (or possibly from a list of empty super-blocks). The thread then allocates and initializes the fields of a super-block descriptor 108, and organizes the super-block 118 into a list of memory blocks 120 of a desired size, while reserving one block 120 for itself and taking a number of credits. Next, at step 702, the thread installs the new super-block 118 as the active super-block 118 for the associated heap, by using CAS.

At step 704, the CAS succeeds only if the active field 106 of the heap header 102 is found to be null. If so, then the thread has succeeded in allocating a memory block 120. If CAS fails at step 704, the thread can take a memory block 120 and push the super-block 118 in a list of partial super-blocks 118. Alternatively, if it is desirable to minimize fragmentation of super-blocks 118, the thread can return the super-block 118 to the operating system and proceed to try to allocate a memory block 120 from the active super-block 118.

The following is representative code for the method for attempting to allocate a memory block 120 from a partial super-block 118:

```
        void* MallocFromNewSB(heap) {
1       desc = DescAlloc( );
2       desc->sb = alloc_from_OS(sbsize);
3       Organize blocks in a linked list starting with index 0.
4       desc->heap = heap;
5       desc->Anchor.avail = 1;
6       desc->sz = heap->sz;
7       desc->maxcount = sbsize/desc->sz;
8       newactive = desc;
9       newactive.credits = min(desc->maxcount-1,MAXCREDITS)-1;
10      desc->Anchor.count = desc->maxcount-2-newactive.credits;
11      desc->Anchor.state = ACTIVE;
12      fence. // make sure that initialization of the descriptor fields have
            been done.
13      if CAS((&heap->Active,NULL,newactive) {
14          addr = desc->sb;
15          *addr = desc; return addr+EIGHTBYTES;
        } else {
16          Return desc->sb to the operating system
17          DescRetire(desc); return NULL;
        }
}
```

Figure 8:
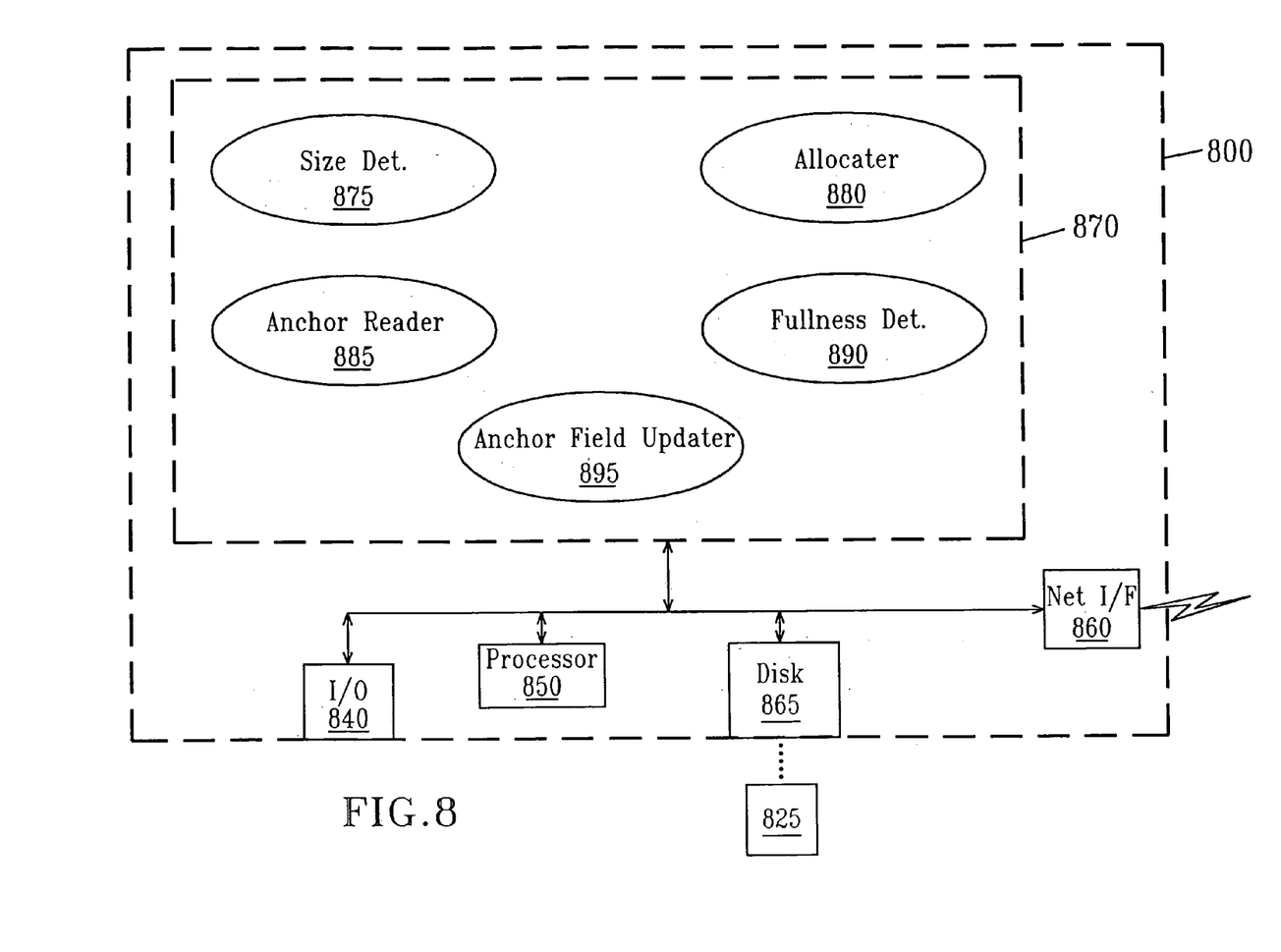
FIG. 8, is a diagram of a computer system that relates to embodiments of the present invention.

FIG. 8 illustrates a further embodiment of the present invention that comprises a computer system for the dynamic allocation and deallocation of memory blocks 120. For purposes of clarity, the computer system 800 is illustrated as a single or stand-alone server computer, but as persons skilled in the art will recognize, the system can include multiple layers of servers (e.g., front-end and back-end) and storage devices; the client computer operated can be a conventional personal computer.

The computer also includes other hardware and software elements conventionally included in personal computers, a processor 850, disk storage device 865 such as a hard disk drive, input/output interfaces 840, a network interface 860, a removable read/write storage device 825 such as a drive that uses a CD-ROM or floppy disk 825.

The software elements of the programmed computer are illustrated for purposes of clarity as executable in a main memory 870, but as persons skilled in the art will understand they may not in actuality reside simultaneously or in their entireties in memory 870. The computer has other hardware and software elements of the types conventionally included in personal computers, such as an operating system, but are not shown for purposes of clarity. Note that software elements can be loaded into the computer via read/write storage device 825 or the network interface 860.

The software elements of the programmed computer for the allocation of requested memory blocks 120 include a memory block size determining means 875 for determining the size of a requested memory block 120. A memory block allocating means 880 for allocating a memory block 120 directly from an operating system if it is determined that the memory block 120 is a predetermined large size and for allocating a memory block 120 from an active memory super-block 118 if it is determined that the memory block 120 is a predetermined regular size. The memory block allocation means 880 allocates a memory block 120 from a partial super-block 118 if the allocation of a memory block 120 directly from the active memory super-block 118 fails, and allocates a memory block 120 from a new super-block 118 if the step of allocating a memory block 120 from the partial super block 118 fails.

The software elements of the programmed computer for deallocating a previously allocated memory block 120 includes a memory block size determination means 875 for determining the size of a memory block 120, wherein the memory block 120 is returned to the operating system if it is determined that the memory block 120 is a large block. Additionally, the system comprises a means to read the anchor field 885 of an associated memory super-block 118 in order to acquire the availability, count and state values of the memory super-block 118. Further, the system comprises a capacity determining means 890 to determine if the memory super-block is full or not full; and a means for the atomic updating of an anchor field 895 of the associated memory super-block 118.

It is to be understood that the systems and methods described herein may be implemented in various forms of hardware, software, firmware, special purpose processors, or a combination thereof. It is to be further understood that, because some of the constituent system components and process steps depicted in the accompanying Figures are preferably implemented in software, the connections between system modules (or the logic flow of method steps) may differ depending upon the manner in which the present invention is programmed.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for allocating a memory block, comprising determining the size of a requested memory block;
  for requested memory block of a predetermined size, allocating the requested memory block in the order of, from an active memory super-block, from a partial super-block, and from a new super-block; and
  returning the memory block in response to the request;
  wherein the step of allocating a memory block from an active super-block further comprises the step of reading an active field of a memory block's heap header, wherein if a pointer value read from the active field is null then the allocation of the memory block fails, and if the pointer value is not null then a thread checks if a value of credits read from the active field is zero or more.

2. The method of claim 1, further comprising for the requested memory block not allocated directly from an operating system, allocating a memory block from the active super-block.

3. The method of claim 1, wherein if the value of credits is zero and the anchor field holds the same active field value as previously read, then the thread updates the active field to a null value, and if the value of credits is one or more and the anchor field holds the same active field value as previously read then the thread tries to atomically update the active field by decrementing the credit value.

4. The method of claim 3, wherein if the updating of the active field fails, then the thread reads a fresh value from the anchor field and if the updating of the active field succeeds, then the thread reads the anchor field descriptor values corresponding to block availability, count and state of a super-block.

5. The method of claim 4, wherein if the value of credits was more than zero and the anchor field descriptor of the super-block holds the same availability value as previously read, then the thread atomically updates the anchor field by setting the available value to an index of a next available memory block.

6. The method of claim 5, wherein if the value of credits equals zero and the count value of the super-block equals zero and the anchor field descriptor of the super-block holds the same count value as previously read, then the thread atomically updates the anchor field of the super-block by setting the state value to FULL and if the value of credits is not equal to zero and the count value of the super-block is greater than zero and the anchor field descriptor of the super-block holds the same count value as previously read, then the thread atomically updates the anchor field of the super-block by setting the availability value to the index of the next available memory block and decrementing the count value.

7. The method of claim 6, wherein if the updating of the active field of the super-block fails, then the thread reads a fresh value from the anchor field of the super-block.

8. The method of claim 7, wherein if the thread has decremented the count value of the anchor field of the super-block, then the thread updates the value of credits of the active field of a memory block's heap header.

9. The method of claim 8, wherein the step of allocating a memory block from a partial super-block further comprises the step of locating a non-empty super-block from a list of partial super-blocks designated within a predetermined size class, wherein if an attempt to locate a non-empty super-block returns a null value, then the step of locating a non-empty super-block fails, and if a non-empty super-block is located, then the thread reads the anchor field of the super-block descriptor for values corresponding to for values corresponding to availability, count and state.

10. The method of claim 9, wherein if the count value is equal to one and the anchor field descriptor of the super-block holds the same value as previously read, then the thread atomically updates the anchor field by setting the state value to FULL, and if the count value is greater than one and the anchor field descriptor of the super-block holds the same value as previously read, then the thread atomically updates the anchor field by setting the availability value to the index of the next available block and decrement the credits of the count value and further, if the updating of the anchor field of the super-block fails, then the thread reads a fresh value from the anchor field of the super-block.

11. The method of claim 10, wherein if the thread has decremented the count value of the anchor field of the super-block, then the thread updates the value of credits of the active field of a memory block's heap header.

12. The method of claim 11, wherein the step of allocating a memory block from a new super-block further comprises the step of initializing the value fields of the new super-block and organizing the new super-block into memory blocks of a predetermined size and atomically updating the anchor field descriptor of a memory by installing the address of the anchor field descriptor and installing an initial credit value of the new super-block in the heap header of the memory block.

13. The method of claim 12, wherein if the updating of the heap header fails, then the anchor field descriptor is retired and the super-block is freed.

14. The method of claim 13, wherein the step of updating the credit value of a heap header comprises the step of the thread atomically updating the anchor field of a heap header by setting the active pointer to the address of an associated super-block descriptor and decrementing the credit value by one of the credit value decremented earlier from the count value of the anchor field of the super-block descriptor, if the active field is determined to hold a null value.

15. The method of claim 14, wherein if the atomic updating of the anchor field of the heap header fails, then the thread atomically updates the anchor field by adding the credit value to the count value and setting the state value to PARTIAL.

16. The method of claim 15, further comprising the step of inserting the super-block into a list of super-blocks that are associated with a predetermined size class.

17. A method for deallocating a previously allocated memory block, comprising the steps of:
  reading an anchor field descriptor of an associated memory super-block in order to acquire an availability descriptor, count descriptor and state descriptor value of the memory super-block;
  determining if the memory super-block is full or not full; and
  atomically updating the anchor field descriptor of the associated memory super-block.

18. The method of claim 17, wherein if the memory super-block is determined to be full, then a thread tries to atomically update the anchor field of the associated super-block descriptor.

19. The method of claim 18, wherein if the memory super-block is determined to be not full, then the thread checks if all of the other blocks in the super-block are available and that the memory super-block is found to be not active, wherein if the memory super-block is not active and the anchor field holds the same state value as previously read, then the thread tries to atomically update the anchor field by setting the anchor field state to empty.

20. The method of claim 19, wherein if the memory super-block is determined to be not full, then the thread checks if all of the other blocks in the super-block are available and that the memory super-block is not active, wherein if the memory super-block is found to be active and the anchor field holds the same state value as previously read, then the thread tries to atomically update the anchor field values by setting the availability descriptor to an index of the deallocated memory block and incrementing the value of the count descriptor.

21. The method of claim 20, wherein if the step of atomically updating of the anchor field descriptor of the associated super-block fails because the value of the anchor field differs from the value previously read from the anchor field value, then the thread reads and acquires fresh anchor field values.

22. The method of claim 21, wherein if the read value of the state descriptor of the anchor field was full, the thread must insert the memory super-block descriptor into a list of partially full memory super-blocks.

23. The method of claim 22, wherein if the new state descriptor of the anchor field is empty, the memory super-block is returned to the operating system.

24. The method of claim 22, wherein if the new state descriptor of the anchor field is empty, the memory super-block is placed on a list of empty memory super-blocks.

25. A computer program product that includes a computer readable medium useable by a processor, the medium having stored thereon a sequence of instructions which, when executed by the processor, causes the processor to allocate a memory block, wherein the computer program product executes the steps of:
  determining the size of a requested memory block;
  for requested memory block of a predetermined size, allocating the requested memory block in the order of from an active memory super-block, from a partial super-block, and from a new super-block; and
  returning the memory block in response to the request,
  wherein the step of allocating a memory block from an active super-block further comprises the step of reading an active field of a memory block's heap header, wherein if a pointer value read from the active field is null, then the allocation of the memory block fails and if the pointer value is not null, then a thread checks if a value of credits read from the active field is zero or more.

26. A computer program product of claim 25, further comprising for the requested memory block not allocated directly from an operating system, allocating a memory block from the active super-block.

27. The computer program product of claim 25, wherein if the value of credits is zero and the anchor field holds the same active field value as previously read, then the thread updates the active field to a null value and if the value of credits is one or more and the anchor field holds the same active field value as previously read, then the thread tries to atomically update the active field by decrementing the credit value.

28. The computer program product of claim 27, wherein if the updating of the active field fails, then the thread reads a fresh value from the anchor field and if the updating of the active field succeeds, then the thread reads the anchor field descriptor values corresponding to block availability, count and state of a super-block.

29. The computer program product of claim 28, wherein if the value of credits was more than zero and the anchor field descriptor of the super-block holds the same availability value as previously read, then the thread, then the thread atomically updates the anchor field by setting the available value to an index of a next available memory block.

30. The computer program product of claim 29, wherein if the value of credits equals zero and the count value of the super-block equals zero and the anchor field descriptor of the super-block holds the same count value as previously read, then the thread atomically updates the anchor field of the super-block by setting the state value to FULL and if the value of credits is not equal to zero and the count value of the super-block is greater than zero and the anchor field descriptor of the super-block holds the same count value as previously read, then the thread atomically updates the anchor field of the super-block by setting the availability value to the index of the next available memory block and decrementing the count value.

31. The computer program product of claim 30, wherein if the updating of the active field of the super-block fails, then the thread reads a fresh value from the anchor field of the super-block.

32. The computer program product of claim 31, wherein if the thread has decremented the count value of the anchor field of the super-block, then the thread updates the value of credits of the active field of a memory block's heap header.

33. The computer program product of claim 32, wherein the step of allocating a memory block from a partial super-block further comprises the step of locating a non-empty super-block from a list of partial super-blocks designated within a predetermined size class, wherein if an attempt to locate a non-empty super-block returns a null value, then the step of locating a non-empty super-block fails, and if a non-empty super-block is located, then the thread reads the anchor field of the super-block descriptor for values corresponding to for values corresponding to availability, count and state.

34. The computer program product of claim 33, wherein if the count value is equal to one and the anchor field descriptor of the super-block holds the same count value as previously read, then the thread atomically updates the anchor field by setting the state value to FULL, and if the count value is greater than one and the anchor field descriptor of the super-block holds the same count value as previously read, then the thread atomically updates the anchor field by setting the availability value to the index of the next available block and decrement the credits of the count value and further, if the updating of the anchor field of the super-block fails, then the thread reads a fresh value from the anchor field of the super-block.

35. The computer program product of claim 34, wherein if the thread has decremented the count value of the anchor field of the super-block, then the thread updates the value of credits of the active field of a memory block's heap header.

36. The computer program product of claim 35, wherein the step of allocating a memory block from a new super-block further comprises the step of initializing the value fields of the new super-block and organizing the new super-block into memory blocks of a predetermined size and atomically updating the anchor field descriptor of a memory by installing the address of the anchor field descriptor and installing an initial credit value of the new super-block in the heap header of the memory block.

37. The computer program product of claim 36, wherein if the updating of the heap header fails, then the anchor field descriptor is retired and the super-block is freed.

38. The computer program product of claim 37, wherein the step of updating the credit value of a heap header comprises the step of the thread atomically updating the anchor field of a heap header by setting the active pointer to the address of an associated super-block descriptor and decrementing the credit value by one of the credit value decremented earlier from the count value of the anchor field of the super-block descriptor, if the active field is determined to hold a null value.

39. The computer program product of claim 38, wherein if the atomic updating of the anchor field of the heap header fails, then the thread atomically updates the anchor field by adding the credit value to the count value and setting the state value to PARTIAL.

40. The computer program product of claim 39, further comprising the step of inserting the super-block into a list of super-blocks that are associated with a predetermined size class.

41. A computer program product that includes a computer readable medium useable by a processor, the medium having stored thereon a sequence of instructions which, when executed by the processor, causes the processor to deallocate a memory block, wherein the computer program product executes the steps of:
  reading an anchor field descriptor of an associated memory super-block in order to acquire an availability descriptor, count descriptor and state descriptor value of the memory super-block;
  determining if the memory super-block is full or not full; and
  atomically updating the anchor field descriptor of the associated memory super-block.

42. The computer program product of claim 41, wherein if the memory super-block is determined to be full, then a thread tries to atomically update the anchor field of the associated super-block descriptor.

43. The computer program product of claim 42, wherein if the memory super-block is determined to be not full, then the thread checks if all of the other blocks in the super-block are available and that the memory super-block is found to be not active, wherein if the memory super-block is not active and the anchor field holds the same state value as previously read, then the thread tries to atomically update the anchor field by setting the anchor field state to empty.

44. The computer program product of claim 43, wherein if the memory super-block is determined to be not full, then the thread checks if all of the other blocks in the super-block are available and that the memory super-block is not active, wherein if the memory super-block is found to be active and the anchor field holds the same state value as previously read, then the thread tries to atomically update the anchor field values by setting the availability descriptor to an index of the deallocated memory block and incrementing the value of the count descriptor.

45. The computer program product of claim 44, wherein if the step of atomically updating of the anchor field descriptor of the associated super-block fails because the value of the anchor field differs from the value previously read from the anchor field value, then the thread reads and acquires fresh anchor field values.

46. The computer program product of claim 45, wherein if the read value of the state descriptor of the anchor field was full, the thread must insert the memory super-block descriptor into a list of partially full memory super-blocks.

47. The computer program product of claim 46, wherein if the new state descriptor of the anchor field is empty, the memory super-block is returned to the operating system.

48. The computer program product of claim 46, wherein if the new state descriptor of the anchor field is empty, the memory super-block is placed on a list of empty memory super-blocks.

49. A computer system for allocating a memory block, comprising:

a memory block size determining means for determining the size of a requested memory block;

a processor operable to allocate a memory block directly from an operating system if it is determined that the memory block is a predetermined large size and for allocating a memory block from an active memory super-block if it is determined that the memory block is a predetermined regular size, wherein the memory block allocation means allocates a memory block from a partial super-block if the step of allocating a memory block directly from the active memory block fails, and allocating a memory block from a new super-block if the step of allocating a memory block from the partial super block fails.

50. A computer system for deallocating a previously allocated memory block, comprising:

a memory block size determination means for determining the size of a memory block, wherein the memory block is returned to the operating system if it is determined that the memory block is a large block;

a processor operable to read the anchor field descriptor of an associated memory super-block in order to acquire an availability descriptor, count descriptor and state descriptor value of the memory super-block;

the processor further operable to determine if the memory super-block is full or not full, and to atomically update the anchor field descriptor of the associated memory super-block.

* * * * *